United States Patent
Liu et al.

(10) Patent No.: US 9,507,555 B2
(45) Date of Patent: Nov. 29, 2016

(54) SYSTEM FOR THE NETWORK MONITORING OF 3D PRINTING AND METHOD THEREOF

(71) Applicant: INVENTEC APPLIANCES CORP., New Taipei (TW)

(72) Inventors: Ying Liu, Shanghai (CN); Li Yu, Shanghai (CN); Shih-Kuang Tsai, New Taipei (TW)

(73) Assignee: INVENTEC APPLIANCES CORP., New Taipei (TW)

( * ) Notice: Subject to any disclaimer, the term of this patent is extended or adjusted under 35 U.S.C. 154(b) by 154 days.

(21) Appl. No.: 14/471,615

(22) Filed: Aug. 28, 2014

(65) Prior Publication Data

US 2015/0312119 A1    Oct. 29, 2015

(30) Foreign Application Priority Data

Apr. 23, 2014  (TW) .......................... 201410166331

(51) Int. Cl.
| | |
|---|---|
| G06F 15/173 | (2006.01) |
| G06F 3/12 | (2006.01) |
| B33Y 50/02 | (2015.01) |
| H04L 12/26 | (2006.01) |
| B29C 67/00 | (2006.01) |

(52) U.S. Cl.
CPC ......... *G06F 3/1285* (2013.01); *B29C 67/0088* (2013.01); *B33Y 50/02* (2014.12); *G06F 3/1207* (2013.01); *G06F 3/1229* (2013.01); *G06F 3/1259* (2013.01); *H04L 43/0817* (2013.01); *B29C 67/0051* (2013.01)

(58) Field of Classification Search
CPC .............. H04L 43/10; H04L 67/2823; H04L 43/0817; G06F 3/1229; G06F 3/1259; G06F 3/1285; G06F 3/1275; G06F 3/1237
USPC ......................................... 709/201
See application file for complete search history.

(56) References Cited

U.S. PATENT DOCUMENTS

| | | | | |
|---|---|---|---|---|
| 2014/0058959 | A1* | 2/2014 | Isbjornssund | G06F 21/10 705/310 |
| 2015/0244878 | A1* | 8/2015 | MaCauley | G06F 3/1204 358/1.2 |
| 2015/0263886 | A1* | 9/2015 | Wang | H04L 41/08 370/254 |
| 2015/0350278 | A1* | 12/2015 | Isbjornssund | H04L 9/00 700/98 |

FOREIGN PATENT DOCUMENTS

CN           102855657           1/2013

* cited by examiner

*Primary Examiner* — Kristie Shingles
(74) *Attorney, Agent, or Firm* — Foster Pepper PLLC; Richard A. Koske; P. G. Scott Born

(57) ABSTRACT

Monitoring a 3D printer comprises a network information module, a photographic device, a status report module, and a fixed format instruction receiver module. The photographic device is capable of periodically shooting a print status of the 3D printer. The status report module is capable of periodically reporting the print status or instantly reporting a print error of the 3D printer. The fixed format instruction receiver module is capable of receiving a remote fixed format instruction to operate the 3D printer. Thus, the system may not require an operator to monitor the 3D printer for long. Even on the remote end, the system can monitor a print status of a printed object and may execute a corresponding treatment when a print error of the 3D printer has occurred.

12 Claims, 3 Drawing Sheets

SYSTEM FOR THE NETWORK MONITORING OF 3D PRINTING AND METHOD THEREOF

PRIORITY CLAIM

This application claims the benefit of the filing date of Taiwan Patent Application No. 201410166331.2, filed Apr. 23, 2014, entitled "A SYSTEM FOR THE NETWORK MONITORING OF 3D PRINTING AND METHOD THEREOF," and the contents of which are hereby incorporated by reference in their entirety.

FIELD OF THE INVENTION

The present invention relates to a 3D printing technology, more particularly, to a system for the network monitoring of 3D printing and the method thereof.

BACKGROUND 3D printing technology is under rapid development, and is a stereo printing technology which can print out a 3D entity model. Therefore, the application of 3D printing technology in the industry and the manufacturing industry are becoming more frequent, such as in the medical modeling processing industry, automobile manufacturing industry, and many other industries.

However, 3D printing technology works using fused deposition modeling technology, which requires relatively long printing times for models with a large volume and high complexity. Additionally, the quality of a printed object decreases when a printing error occurs during the printing from the 3D printer. Therefore, conventional systems for monitoring the quality of a printed object require an operator to stand by the 3D printer for a long duration in order to instantly detect any malfunctions with the printing. However, the conventional systems cannot instantly understand these malfunctions and actuate the corresponding treatment simultaneously when the printing error of the 3D printer occurs while the operator is gone.

SUMMARY OF THE INVENTION

Thus, the present invention provides a system for the network monitoring of 3D printing and the method thereof. The present invention comprises a network information module, a photographic device, a status reporting module, and a fixed format instruction receiver module for periodically reporting the printing status, instantly reporting any printing errors from the 3D printer, and receiving a remote fixed format instruction to operate the 3D printer.

The present invention further provides a system for the network monitoring of 3D printing. The system for the network monitoring of 3D printing is used to monitor a 3D printer printing a printed object and comprises a network information module, a photographic device, a status report module, and a fixed format instruction receiver module.

The network information module is connected to the 3D printer for setting and storing a network address of the 3D printer, a network address of a remote device, and a time interval for periodically sending the network information. The photographic device is configured on the 3D printer. The status reporting module is connected to the network information module and the photographic device to trigger the photographic device to automatically take a picture of the printed object when a printing time is conformed to the time interval and sending the picture and a print status data to the remote device through the use of the network information module. The fixed format instruction receiver module is connected to the 3D printer to receive a fixed format instruction sent from the remote device and analyzing the fixed format instruction in order to control the 3D printer.

A hardware interrupt signal is sent out when a printing error occurs during the printing from the 3D printer. The status report module triggers the photographic device to take the picture of the printed object when the hardware interrupt signal is received and sends the picture and the print status data to the remote device through the network information module. The printing error of the 3D printer is then understood using the picture and the print status data received from the remote device. Then the fixed format instruction, such as a <STOP> command or a <PAUSE> command, is sent from the remote device to the fixed format instruction receiver module.

When the fixed format instruction sent from the remote device is received by the fixed format instruction receiver module, the fixed format instruction is then analyzed by the fixed format instruction receiver module. Then the fixed format instruction receiver module sends a G-code command to a control program of the 3D printer to execute a corresponding action to either pause or stop the 3D printer.

Additionally, the present invention further provides a method for the network monitoring of the 3D printing. The method for the network monitoring of 3D printing is used to monitor a 3D printer printing a printed object and comprises the following steps: (S1) establishing a network connection between the 3D printer and a remote device; (S2) periodically sending a network information to the remote device; (S3) determining whether the printing process of the printed object is normal according to the network information when the network information is received by the remote device, if it is not, then sending a fixed format instruction to the 3D printer through the remote device; and (S4) analyzing the fixed format instruction in order to control the 3D printer.

The step (S1) further comprises the following step: setting a network address of the 3D printer and a network address of the remote device.

The step (S2) further comprises the following steps: setting a time interval for periodically sending the network information; starting to calculate a printing time when the 3D printer starts to print the printed object; determining whether the printing time is conformed to the time interval, if it is, then taking a picture of the printed object and sending the picture and a print status data to the remote device.

In conclusion, compared to the prior art, the present invention does not need an operator to stand by the 3D printer for long durations of time. Even when being used remotely, the present invention can still periodically monitor the printing status of a printed object and can monitor whether or not a printing error occurs during the printing of the 3D printer and can proceed with the corresponding treatment automatically in order to solve the disadvantages of the prior art.

DETAILED DESCRIPTION

Figure 1:
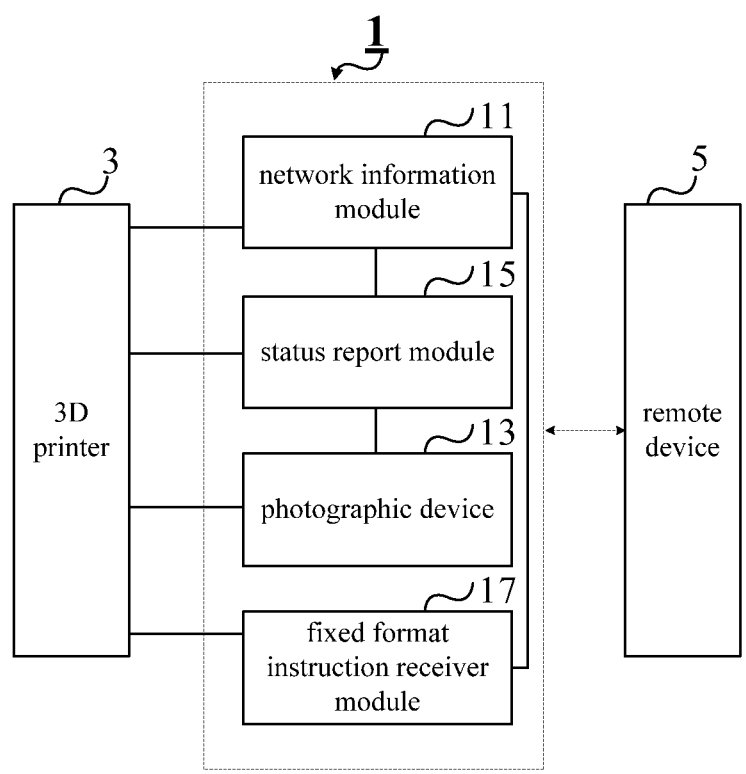
FIG. 1 is a block diagram for the network monitoring of a 3D printing system according to an embodiment of the present invention.

FIG. 1 is a function block diagram illustrating a system for the network monitoring of the 3D printing of the present invention according to one preferred embodiment. As shown in the figure, the system for the network monitoring of the 3D printing 1 is used to monitor a 3D printer 3 printing a printed object and comprises a network information module 11, a photographic device 13, a status report module 15, and a fixed format instruction receiver module 17.

The network information module 11 is connected to the 3D printer 3. The network information module 11 is used to set and store a network address of the 3D printer 3, a network address of a remote device 5, and a time interval to periodically send a network information, wherein the remote device 5 is capable of being a desktop computer, a notebook computer, a tablet personal computer, a smart phone, a handheld computer, etc., but the type of remote device 5 is not limited thereto. Additionally, in the present embodiment, a send-receive way of the network information of the system for the network monitoring of 3D printing comprises an email, an instant notification, an instant page, a broadcasting, or a message.

The photographic device 13 is configured on the 3D printer 3. The status report module 15 is connected to the network information module 11 and the photographic device 13. The status report module 15 is used to trigger the photographic device 13 to take a picture of the printed object when a printing time conforms to a set time interval and sends the picture and a print status data to the remote device 5 through the network information module 11, wherein the time interval is 15 minute, but the length of the time interval is not limited thereto. In practical application, the length of the time interval can be appropriately adjusted according to the case. Additionally, in the present embodiment, the print status data comprises a printing percentage, a number of present printing layers, a total number of printing layers, or a remaining time of the printing.

The fixed format instruction receiver module 17 is connected to the 3D printer 3. The fixed format instruction receiver module 17 is used to receive a fixed format instruction sent from the remote device 5 and analyzes the fixed format instruction in order to control the 3D printer 3, wherein the fixed format instruction receiver module 17 further comprises a G-code command and the 3D printer further comprises a control program. When the fixed format instruction is analyzed by the fixed format instruction receiver module 17, the fixed format instruction receiver module 17 sends the G-code command to the control program of the 3D printer 3 in order to execute a corresponding action for controlling the 3D printer 3. In the present embodiment, the fixed format instruction receiver module 17 is capable of being connected to the network information module 11. The fixed format instruction is sent to the fixed format instruction receiver module 17 through the send method of the network information module 11

Then, a hardware interrupt signal is sent out when a printing error occurs during the printing of the 3D printer 3. The status report module 15 triggers the photographic device 13 to take the picture of the printed object when the hardware interrupt signal is received and sends the picture and the print status data to the remote device 5 through the network information module 11.

The printing error of the 3D printer 3 is then understood through the picture and the print status data received from the remote device 5. At the same time, the fixed format instruction is sent from the remote device 5 to the fixed format instruction receiver module 17, wherein the fixed format instruction comprises a <STOP> command or a <PAUSE> command, but the fixed format instruction is not limited thereto. In practical application, the fixed format instruction may also be an <OK> command or a <START> command, etc., and the fixed format instruction can be appropriately adjusted according to the case.

When the fixed format instruction sent from the remote device 5 is received by the fixed format instruction receiver module 17, the fixed format instruction is then analyzed in order to control whether the 3D printer 3 needs to pause or stop printing.

Additionally, in the system for the network monitoring of the 3D printing of the present invention, the picture and the print status data can be received through the remote device 5. The fixed format instruction, such as a <STOP> command or a <PAUSE> command, can be edited and sent from the remote device 5 to the fixed format instruction receiver module 17 when the printing process of the printed object is abnormal, which is perceived from the picture and the print status data. In practical application of the present invention, the fixed format instruction can be sent to the fixed format instruction receiver module 17 through the send method of the network information.

Figure 2:
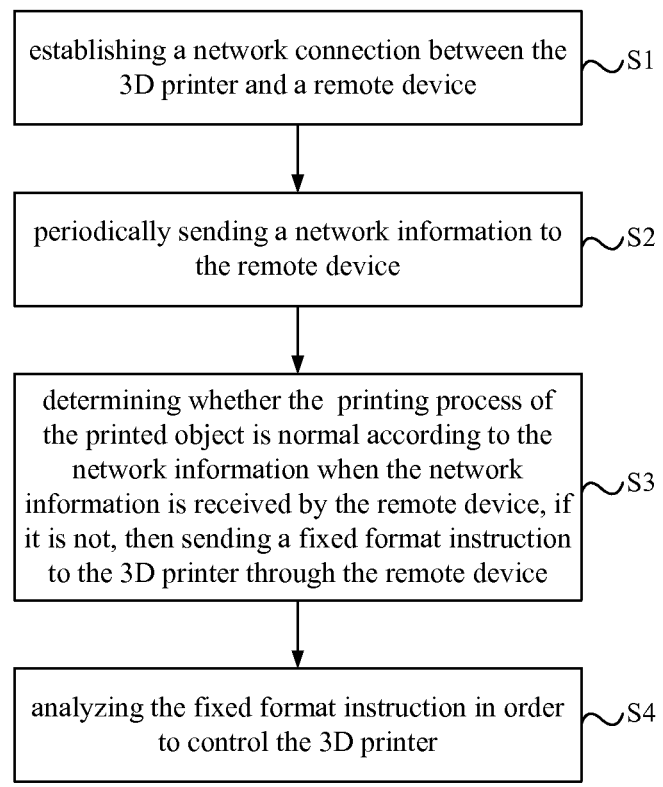
FIG. 2 is a flow chart illustrating a method for network monitoring of a 3D printing system according to an embodiment of the present invention.

FIG. 2 is a method flow chart illustrating a method for the network monitoring of the 3D printing of the present invention according to a preferred embodiment. As shown in the figure, the method for the network monitoring of 3D printing of the present invention is used for monitoring a 3D printer 3 printing a printed object and comprises the following steps: (S1) establishing a network connection between the 3D printer and a remote device; (S2) periodically sending a network information to the remote device; (S3) determining whether the printing process of the printed object is normal according to the network information when the network information is received by the remote device, if it is not, then sending a fixed format instruction to the 3D printer through the remote device; and (S4) analyzing the fixed format instruction to control the 3D printer.

In the present embodiment, the step (S1) further comprises the following step: setting a network address of the 3D printer and a network address of the remote device.

In the present embodiment, the step (S2) further comprises the following steps: setting a time interval to periodically send the network information; starting to calculate a printing time when the 3D printer starts printing the printed object; determining whether a printing error occurs during the printing of the 3D printer; and determining whether the printing time is conformed to the time interval, if it is, then taking a picture of the printed object and sending the picture and a print status data to the remote device, wherein the network information comprises the picture and the print status data.

In the present embodiment, in the step of determining whether the printing error occurs during the printing of the 3D printer, if it is, then the method further comprises the following steps of: taking the picture of the printed object and sending the picture and the print status data to the remote device; receiving the picture and the print status data through the remote device; sending the fixed format instruction to the 3D printer through the remote device; and analyzing the fixed format instruction in order to control the 3D printer.

Figure 3:
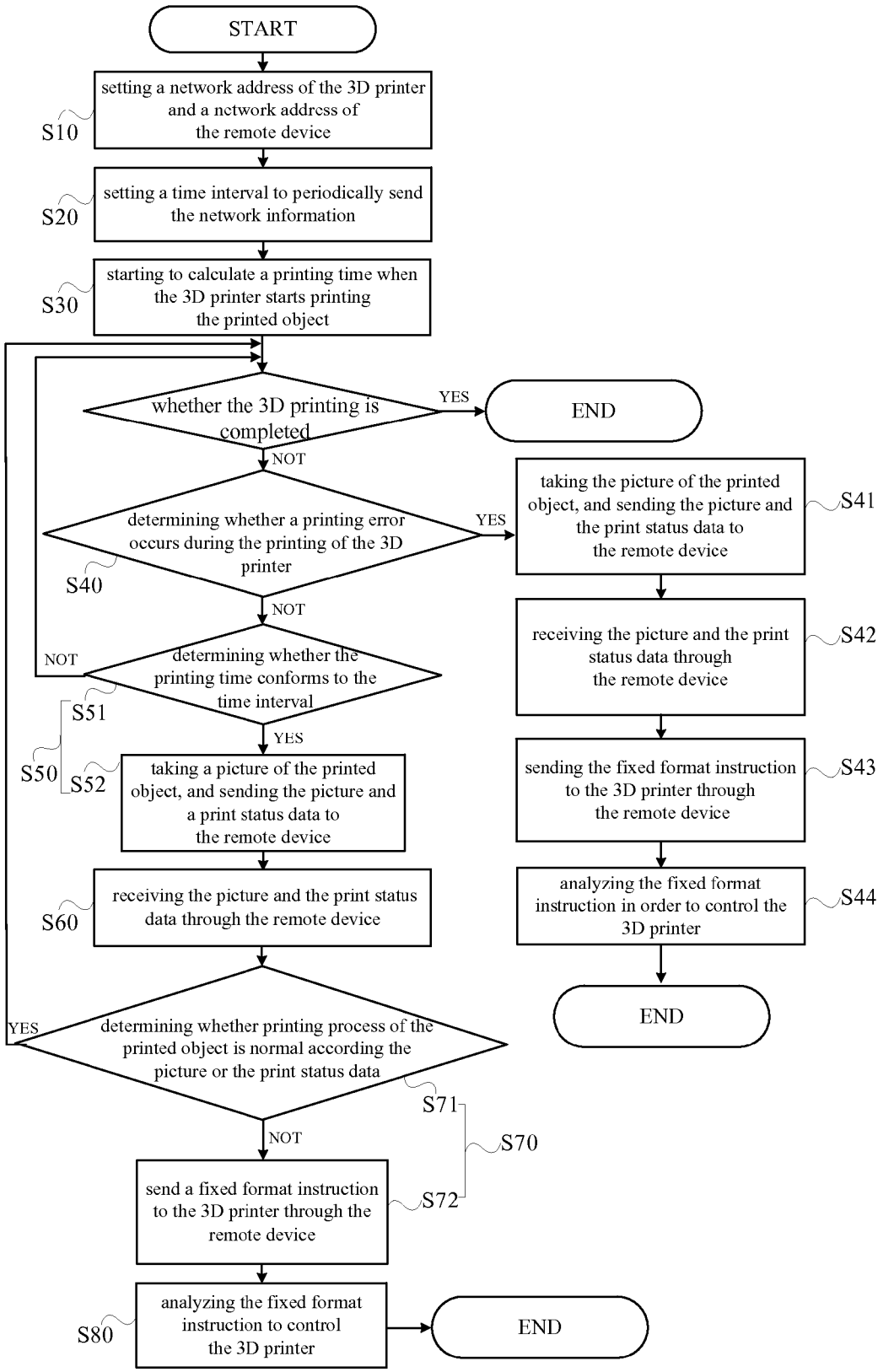
FIG. 3 is a flow chart illustrating a method for a network monitoring of a 3D printing system according to another embodiment of the present invention.

FIG. 3 is a method flow chart illustrating a method for the network monitoring of the 3D printing of the present invention according to another preferred embodiment of the present invention. As shown in the figure, the method for the network monitoring of 3D printing of the present invention is used for monitoring a 3D printer 3 printing a printed object and comprises the following steps: (S10) setting a network address of the 3D printer and a network address of the remote device; (S20) setting a time interval to periodically send the network information; (S30) starting to calculate a printing time when the 3D printer starts printing the printed object; (S40) determining whether a printing error occurs during the printing of the 3D printer, if there is not, then taking the next step (S50); (S50) determining whether the printing time conforms to the time interval, if it does, then taking a picture of the printed object and sending the picture and a print status data to the remote device; (S60) receiving the picture and the print status data through the remote device; (S70) determining whether the printing process of the printed object is normal according to the picture or the print status data, if it is not, then send a fixed format instruction to the 3D printer through the remote device; and (S80) analyzing the fixed format instruction to control the 3D printer.

In the present embodiment, a method of sending-receiving of the step (S10) comprises an email, an instant notification, an instant page, a broadcast, or a message.

In the present embodiment, when the step (S40) determines that a printing error has occurred during the printing of the 3D printer, the method further takes the following steps: (S41) taking the picture of the printed object and sending the picture and the print status data to the remote device; (S42) receiving the picture and the print status data through the remote device, to understand the print status of the 3D printer; (S43) sending the fixed format instruction to the 3D printer through the remote device, in practical application, the fixed format instruction comprises a <STOP> command or a <PAUSE> command, but the fixed format instruction is not limited thereto; and (S44) analyzing the fixed format instruction in order to control the 3D printer to either pause or stop printing.

In the present embodiment, the step (S50) further comprises a step (S51) and a step (S52), wherein the step (S51) is determining whether the printing time is conformed to the time interval, if it is, then proceed with the step (S52), where the step (S52) is taking a picture of the printed object and sending the picture and a print status data to the remote device. Additionally, said taking a picture of the printed object in the step (S50) is accomplished by a photographic device. In the present embodiment, the photographic device is configured to be directed on the 3D printer, but the set up location of the photographic device is not limited thereto. In practical application, the set up location of the photographic device can be appropriately adjusted according to the case. Moreover, in the present embodiment, the print status data comprises a printing percentage, a number of present printing layers, a total number of printing layers, or a remaining time of the printing.

In practical application, in the step (S60), the picture and the print status data in a remote end can be received through the remote device to understand the print status of the 3D printer.

In the present embodiment, the step (S70) further comprises a step (S71) and a step (S72), wherein the step (S71) is determining whether the printing process of the printed object is normal according to the picture or the printing status data, if it is not, then proceeding with the step (S72), which is sending a fixed format instruction to the 3D printer through the remote device.

In practical application, after the fixed format instruction is analyzed in the step (S80), the method sends a G-code command to a control program of the 3D printer in order to execute a corresponding action to control the 3D printer.

In conclusion, the system of the invention for the network monitoring of the 3D printer and the method of the invention thereof comprises: the network information module, the photographic device, the status report module, and the fixed format instruction receiver module. The network information module is capable of setting and storing the network information. The photographic device is capable of periodically shooting the print status of the 3D printer. The status report module is capable of periodically reporting the print status or instantly reporting a print error of the 3D printer and the fixed format instruction receiver module is capable of receiving a remote fixed format instruction in order to operate the 3D printer. Thus, compared to the prior art, the present invention does not require an operator to constantly monitor a 3D printer. Even on the remote end, the present invention can still monitor the print status of the printed object, and the present invention is capable of executing the corresponding treatment simultaneously when the printing error of the 3D printer occurs. Therefore, the present invention can solve the disadvantages of the prior art.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

The invention claimed is:

1. A system for the network monitoring of 3D printing, used for monitoring a 3D printer printing a printed object, comprising:
   a network information module, connected to the 3D printer, for setting and storing a network address of the 3D printer, a network address of a remote device, and a time interval for periodically sending a network information;
   a photographic device, configured on the 3D printer, the photographic device being used for taking a picture of the printed object during the printing of the 3D printer;
   a status report module, connected to the network information module and the photographic device, for triggering the photographic device to take the picture of the printed object when a printing time conforms to the time interval and when a hardware interrupt signal is received, and sending the picture and a printing status data to the remote device through the network information module, wherein the hardware interrupt signal is sent out when a printing error occurs during the printing of the 3D printer; and
   a fixed format instruction receiver module, connected to the 3D printer, for receiving a fixed format instruction sent from the remote device, and analyzing the fixed format instruction to control the 3D printer.

2. The system for the network monitoring of 3D printing of claim 1, wherein the fixed format instruction comprises a <STOP> command or a <PAUSE> command, when the fixed format instruction sent from the remote device is received by the fixed format instruction receiver module, the fixed format instruction is analyzed for controlling whether the 3D printer pauses or stops printing.

3. The system for the network monitoring of 3D printing of claim 2, wherein the fixed format instruction receiver module further comprises a G-code command, the 3D printer further comprises a control program, when the fixed format instruction is analyzed by the fixed format instruction receiver module, the fixed format instruction receiver module sends the G-code command to the control program of the 3D printer to execute a corresponding action for controlling the 3D printer.

4. The system for the network monitoring of 3D printing of claim 1, wherein the printing status data comprises a printing percentage, a number of present printing layers, a total number of printing layers, or a remaining time of printing.

5. The system for network monitoring of 3D printing of claim 1, wherein the method of sending-receiving of the network information comprises an email, an instant notification, an instant page, a broadcast, or a message.

6. A method for the network monitoring of 3D printing, used for monitoring a 3D printer printing a printed object, comprising the following steps of:
    establishing a network connection between the 3D printer and a remote device;
    determining whether a printing error occurs during the printing of the 3D printer, if YES, taking a picture of the printed object and sending the picture and a printing status data to the remote device, if No, taking the picture of the printed object during the printing of the 3D printer periodically;
    periodically sending network information including the periodically taken picture to the remote device;
    determining whether the printing process of the printed object is normal according to the network information when the network information is received by the remote device, if NOT, then sending a fixed format instruction to the 3D printer through the remote device; and
    analyzing the fixed format instruction to control the 3D printer.

7. The method for the network monitoring of 3D printing of claim 6, wherein the step of establishing the network connection between the 3D printer and the remote device further comprises the following step of:
    setting a network address of the 3D printer and a network address of the remote device.

8. The method for the network monitoring of 3D printing of claim 6, wherein the step of periodically sending the network information to the remote device further comprises the following steps of:
    setting a time interval for periodically sending the network information;
    starting to calculate a printing time when the 3D printer starts to print the printed object; and
    determining whether the printing time conforms to the time interval, if YES, then taking the picture of the printed object, and sending the picture and a printing status data to the remote device.

9. The method for the network monitoring of 3D printing of claim 6, wherein in the step of determining whether the printing error occurs during the printing of the 3D printer, if YES, then the method further comprises the following steps of:
    receiving the picture and the printing status data through the remote device;
    sending the fixed format instruction to the 3D printer through the remote device; and
    analyzing the fixed format instruction to control the 3D printer.

10. The method for the network monitoring of 3D printing of claim 9, wherein the step of analyzing the fixed format instruction to control the 3D printer further comprises the following step of:
    sending a G-code command to a control program of the 3D printer to execute a corresponding action for controlling the 3D printer.

11. The method for the network monitoring of 3D printing of claim 8, wherein the printing status data comprises a printing percentage, a number of present printing layers, a total number of printing layers, or a remaining time of printing.

12. The method for network monitoring of 3D printing of claim 6, wherein the method of sending-receiving of the network information comprises an email, an instant notification, an instant page, a broadcast, or a message.

* * * * *